United States Patent
Yuan et al.

(10) Patent No.: US 10,317,189 B2
(45) Date of Patent: Jun. 11, 2019

(54) DETECTION OF MISSAMPLED INTERFEROGRAMS IN FREQUENCY DOMAIN OCT WITH A K-CLOCK

(71) Applicant: KABUSHIKI KAISHA TOPCON, Tokyo (JP)

(72) Inventors: Zhijia Yuan, River Edge, NJ (US); Zhenguo Wang, Fort Lee, NJ (US); Charles A. Reisman, Mamaroneck, NY (US); Kinpui Chan, Ridgewood, NJ (US)

(73) Assignee: Kabushiki Kaisha TOPCON, Tokyo (JP)

(*) Notice: Subject to any disclaimer, the term of this patent is extended or adjusted under 35 U.S.C. 154(b) by 396 days.

(21) Appl. No.: 14/161,796

(22) Filed: Jan. 23, 2014

(65) Prior Publication Data

US 2015/0204651 A1 Jul. 23, 2015

(51) Int. Cl.
*G01B 9/02* (2006.01)

(52) U.S. Cl.
CPC ..... *G01B 9/02075* (2013.01); *G01B 9/02004* (2013.01); *G01B 9/0207* (2013.01); *G01B 9/02069* (2013.01); *G01B 9/02091* (2013.01)

(58) Field of Classification Search
CPC ........... G01B 9/02091; G01B 9/02004; G01B 9/02044; G01B 9/02069; G01B 9/02083;
(Continued)

(56) References Cited

U.S. PATENT DOCUMENTS 5,943,134 A * 8/1999 Yamaguchi ........ G01B 11/0675
356/497
5,991,653 A * 11/1999 Richards-Kortum ........................
A61B 5/0059
250/339.01

(Continued)

FOREIGN PATENT DOCUMENTS

JP 2009503519 A 1/2009
JP 2010515919 A 5/2010
(Continued)

OTHER PUBLICATIONS

Choi et al. "Phase-sensitive swept-source optical coherence tomography imaging of the human retina with a vertical cavity surface-emitting laser light source"; Opt. Lett 38 (3) pp. 338-340 (Feb. 2013).*

(Continued)

*Primary Examiner* — Mohamed K Amara
(74) *Attorney, Agent, or Firm* — Pearne & Gordon LLP (57) ABSTRACT

Optical coherence tomography light sources can be non-linear and attempts to linearize them can lead to asynchrony between the light source and A-line scans and missampling in the scans causing signal noise. Accordingly, a system and methods are provided herein to detect missampling by obtaining a plurality of interferograms; providing at least two wavenumber reference signals at different wavenumbers, wherein the wavenumber reference signals comprise attenuated or enhanced portions of each of the plurality of interferograms; aligning each of the plurality of interfero- (Continued)

grams according to one of the at least two wavenumber reference signals; and for each of the plurality of interferograms, identifying an interferogram as missampled if another of the at least two reference signals does not align with a corresponding reference signal in a statistically significant number of the plurality of interferograms. An optical element, for example, an optical notch, may be used to generate the reference signals.

16 Claims, 8 Drawing Sheets

(58) Field of Classification Search
CPC .............. G01B 9/02027; G01B 9/0203; G01B 9/02075; A61B 5/0066; A61B 3/102; A61B 5/0084; G01N 21/4795; G01N 2201/06113
USPC .......................................... 356/479, 497, 450
See application file for complete search history.

(56) References Cited

U.S. PATENT DOCUMENTS

| | | | | |
|---|---|---|---|---|
| 7,365,858 | B2* | 4/2008 | Fang-Yen | G01B 9/02072 356/489 |
| 8,285,368 | B2* | 10/2012 | Chen | A61B 5/0066 600/101 |
| 8,379,218 | B2* | 2/2013 | Deck | G01B 11/2441 356/479 |
| 8,564,788 | B2* | 10/2013 | Yuan | A61B 3/102 356/479 |
| 9,286,673 | B2* | 3/2016 | Begin | G06T 5/006 |
| 9,292,918 | B2* | 3/2016 | Zagrodsky | G06T 7/0012 |
| 9,301,687 | B2* | 4/2016 | Kemp | A61B 5/6852 |
| 9,307,926 | B2* | 4/2016 | Begin | A61B 8/0841 |
| 9,324,141 | B2* | 4/2016 | Begin | G06T 5/002 |
| 9,360,630 | B2* | 6/2016 | Jenner | G02B 6/3604 |
| 9,367,965 | B2* | 6/2016 | Kemp | G06T 19/00 |
| 9,383,263 | B2* | 7/2016 | Welford | A61B 5/0066 |
| 9,441,944 | B2* | 9/2016 | Kuznetsov | G01B 9/02004 |
| 9,441,948 | B2* | 9/2016 | Vakoc | G01N 21/21 |
| 9,442,065 | B2* | 9/2016 | Gulati | A61B 5/02416 |
| 9,478,940 | B2* | 10/2016 | Welford | H01S 5/50 |
| 9,486,143 | B2* | 11/2016 | Hoseit | A61B 5/0095 |
| 9,596,993 | B2* | 3/2017 | Kemp | G01B 9/02004 |
| 9,612,105 | B2* | 4/2017 | Kemp | G01B 9/02091 |
| 9,622,706 | B2* | 4/2017 | Dick | A61B 5/0062 |
| 9,709,379 | B2* | 7/2017 | Kemp | G01B 9/02091 |
| 9,730,613 | B2* | 8/2017 | Stigall | A61B 5/7425 |
| 9,770,172 | B2* | 9/2017 | Sturm | A61B 5/0037 |
| 9,858,668 | B2* | 1/2018 | Jones | G06T 7/0016 |
| 9,867,530 | B2* | 1/2018 | Pursley | A61B 1/3137 |
| 9,927,355 | B2* | 3/2018 | Giles | G01N 21/3581 |
| 2005/0283058 | A1* | 12/2005 | Choo-Smith | A61B 5/0088 600/315 |
| 2008/0013093 | A1* | 1/2008 | Izatt | A61B 5/0059 356/456 |
| 2008/0165366 | A1 | 7/2008 | Schmitt | |
| 2009/0174931 | A1* | 7/2009 | Huber | H01S 3/1106 359/340 |
| 2010/0305452 | A1 | 12/2010 | Black et al. | |
| 2012/0310081 | A1 | 12/2012 | Adler et al. | |
| 2013/0128267 | A1* | 5/2013 | Kang | G01B 9/02074 356/326 |
| 2013/0331709 | A1* | 12/2013 | Le | G02B 6/32 600/478 |
| 2014/0028997 | A1* | 1/2014 | Cable | G01B 9/02091 356/51 |
| 2015/0109621 | A1* | 4/2015 | Huber | G01B 9/02004 356/479 |

FOREIGN PATENT DOCUMENTS

| | | |
|---|---|---|
| WO | 2007016296 A3 | 2/2007 |
| WO | 2013139480 A1 | 9/2013 |

OTHER PUBLICATIONS

Hendargo, Hansford C. et al. "Doppler velocity detection limitations in spectrometer-based versus swept-source optical coherence tomography" In: Biomedical Optics Express; Aug. 1, 2011, vol. 2, No. 8, pp. 2175-2188.
Poddar, Raju et al. "Three-dimensional anterior segment imaging in patients with type 1 Boston Keratoprosthesis with switchable full depth range swept source optical coherence tomography" In: Journal of Biomedical Optics, Aug. 2013; vol. 18, No. 8, pp. 086002-1-086002-7.
Choi, Woojhon et al. "Phase-sensitive swept source OCT imaging of the human retina with a VCSEL light source" In: Optical Society of America NIH Public Access Author Manuscript, Feb. 1, 2013; vol. 38. No. 3, pp. 338-340.
European Search Report for EP 14 16 9770 dated Jun. 3, 2015.
Choi, Woojhon et al. "Phase-sensitive swept-source optical coherence tomography imaging of the human retina with a vertical cavity surface-emitting laser light source" In: Optic Letters, Optical Society of America, US, vol. 38, No. 3 Feb. 1, 2013, pp. 338-340.
Manapuram, Ravi et al. "Phase-sensitive swept source optical coherence tomography for imaging and quantifying of microbubbles in clear and scattering media" In: Journal os Applied Physics, American Institute of Physics, US, vol. 105, No. 10, May 19, 2009, p. 102040-1-102040-10.
Tsai, Meng-Tsan et al. "Quantitative Phase Imaging With Swept-Source Optical Coherence Tomography for Optical Measurement of Nanostructures" In IEEE Photonics Technology Letters, IEEE Service Center, US, vol. 24, p. 8, Apr. 5, 2012, pp. 1041-1135.

* cited by examiner

DETECTION OF MISSAMPLED INTERFEROGRAMS IN FREQUENCY DOMAIN OCT WITH A K-CLOCK

BACKGROUND OF THE INVENTION

1. Field of the Invention

This application relates generally to optical coherence tomography (OCT) imaging methods and apparatuses and, more specifically, to a method capable of detecting missampling in a swept source OCT imaging system.

2. Description of Related Art

OCT is an imaging technique capable of non-invasively acquiring sub-surface images of a subject at micrometer resolutions. Given such high resolutions, OCT is a preferred imaging technique in medical fields. OCT works by detecting the interference light of a light signal passing through an object and comparing it to a reference light signal. A major advance in this technique is frequency domain OCT (FD-OCT) because it is several hundred times faster than conventional time domain OCT (TD-OCT). FD-OCT includes both spectral domain OCT (SD-OCT) in which the interference light is detected through spectral decomposition, and swept source OCT (SS-OCT) in which interference lights of various wavelengths, interferograms, are obtained using a wavelength-swept light source.

However, because the spectral interferograms are detected in real values, reconstruction of the image consists of a true image and a complex conjugate artifact displayed as a mirror image of the true image. As a result, the measurement depth of the object must be shifted and the possible imaging depth of FD-OCT is shrunk by half. Currently, various phase shifting, modulation, and alternation techniques exist to remove or suppress the problem of complex conjugate artifacts. These techniques are described, for example, in U.S. Pat. No. 8,564,788, which is incorporated by reference herein.

One drawback with such techniques is that they require phase stability in the detected interferogram. In SS-OCT, sequential spectral interferograms are acquired along the lateral direction to construct the axial lines (A-lines) that form a 2D OCT image (B-scan). These interferograms are represented graphically by plotting the intensity of the interference signal in k-space, where k is the wavenumber (the inverse of wavelength) of a frequency in the swept source bandwidth. Due to nonlinear sweeping of wavenumbers by the light source in SS-OCT, an external linear k-clock synchronized to the light source is commonly used to ensure the linearity of the sampling points for the interferogram in k-space. In this way, the data points of the interferogram are acquired at a set of wavenumber points with fixed sampling intervals. In practice, when forming a 2D FD-OCT image, each A-line is first constructed by performing a Fourier transform of the interferogram. It is the Fourier transform that requires the sampling to be linear in k-space, so that the interferogram in k-space is transferred to A-line in depth without errors caused by k-space non-linearity.

Despite the addition of a k-clock, there is still the problem that an asynchrony exists between the k-clock and a sweep trigger used to trigger the light source to begin sweeping frequencies for each A-line scan. This asynchrony results in the uncertainty of the starting wavenumber of the interferogram, which in turn affects phase sensitive measurements by introducing depth dependent phase jittering among A-lines.

To address the asynchrony problem, for example, "Doppler velocity detection limitations in spectrometer-based versus swept-source optical coherence tomography" (Aug. 1, 2011) by Hendargo et al. introduced a fiber Bragg grating (FBG) optical notch filter to the OCT system to ensure a stable starting wavenumber; "Phase-sensitive swept-source optical coherence tomography imaging of the human retina with a vertical cavity surface-emitting laser light source" (Feb. 1, 2013) by Choi et al. similarly introduced an FBG to be used as a wavenumber reference signal so that fluctuations can be numerically compensated for during postprocessing by shifting the interferograms based on the reference signal; and "Three-dimensional anterior segment imaging in patients with type 1 Boston Keratoprothesis with switchable full depth range swept source optical coherence tomography" (August 2013) by Poddar et al. illustrated different locations to place an FBG in the OCT system to generate a reference signal.

BRIEF SUMMARY OF THE INVENTION

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of the summary is to present some concepts related to some exemplary non-limiting embodiments in a simplified form as a prelude to the more detailed description of the various embodiments that follow.

In one aspect, an SS-OCT imaging system is adapted provide wavenumber reference signals at two wavenumbers on the interferogram to correct starting wavenumber uncertainty and detect missampling that occurs during phase sensitive applications. These wavenumber reference signals can be generated, for example, by optical notch filters. To determine whether missampling has occurred, detected interferograms are aligned according to one of the wavenumber reference signal. If the interferograms are misaligned with respect to another of the wavenumber reference signals, then missampling has occurred at some wavenumber between the two wavenumber reference signals. The missampled interferogram may then be corrected or removed from a compiled 2D image.

In another aspect, the bandwidth of the optical notch filter is optimized to reduce the number of samples of an interferogram that are affected by the filter. The optimal bandwidth for the optical notch filter is between one and two times the wavenumber resolution of the SS-OCT system in which the optical notch filters are used.

In a further aspect, the samples of the interferogram affected by the optical notch filter are restored using various techniques, such as interpolation.

According to one example, a method for optical coherence tomography (OCT) imaging comprises the steps of providing at least one optical element to an OCT imaging system configured for generating at least two wavenumber reference signals, wherein the wavenumber reference signals comprise attenuated or enhanced interferogram signals; generating light from a light source; obtaining a plurality of interferograms using an optical detector; aligning each of the plurality of interferograms according to one of the at least two wavenumber reference signals; determining a sample number corresponding to another of the at least two wavenumber reference signals for each of the plurality of interferograms; for each of the plurality of interferograms, identifying an interferogram as missampled if the determined sample number corresponding to the other wavenumber reference signal does not match the determined sample number for the other wavenumber reference signal for a statistically significant number of interferograms; and correcting, replacing, or discarding the identified interferograms.

According to other examples of the above method, the at least one optical element comprises at least one optical notch filter; the statistically significant number of interferograms is a majority of interferograms; the at least one optical notch filter comprises at least one fiber Bragg grating (FBG); the at least one optical element has a bandwidth of between one and two times a wavenumber resolution of the OCT imaging system; the at least one optical element is located before a balanced detector in the OCT imaging system; the method further comprises the steps of obtaining a spectrum profile by summing the absolute value of the interferogram, calculating a transmission ratio at the wavenumber corresponding to each of the at least two wavenumber reference signals, and for each of the plurality of interferograms, recalculating the interferogram at the wavenumber corresponding to each of the at least two wavenumber reference signals by dividing the interferogram at said wavenumber by the transmission ratio; and/or the at least one optical notch filters has a center wavenumber in one half of wavenumbers associated with a light source of the OCT imaging system and another of the at least one optical notch filters has a center wavenumber in the other half of wavenumbers associated with the light source of the OCT imaging system.

According to another example, an OCT imaging system comprises a light source; a reference arm; a sample arm; a detection arm; and at least one optical element configured for generating at least two wavenumber reference signals, wherein the wavenumber reference signals comprise attenuated or enhanced interferogram signals.

According to other examples of the above OCT imaging system, the at least one optical element comprises at least one optical notch filter; the at least one optical notch filter comprises at least one fiber Bragg grating (FBG); the at least one optical element is located in the detection arm; the at least one optical notch filter has a bandwidth between one and two times a wavenumber resolution of the OCT imaging system; one of the at least one optical notch filters has a center wavenumber in one half of wavenumbers associated with a light source of the OCT imaging system and another of the at least one optical notch filters has a center wavenumber in the other half of wavenumbers associated with the light source of the OCT imaging system; the system further comprises a processor configured to obtain a plurality of interferograms, align each of the plurality of interferograms according to one of the at least two wavenumber reference signals, and for each of the plurality of interferograms, identify an interferogram as missampled if another of the at least two wavenumber reference signals does not align with a corresponding wavenumber reference signal in a statistically significant number of the plurality of interferograms; the statistically significant number of the plurality of interferograms is a majority of the plurality of interferograms; and the processor is further configured to correct, replace, or discard the identified interferograms; and/or the processor is further configured to obtain a spectrum profile by summing the absolute value of the interferogram, calculate a transmission ratio at the wavenumber corresponding to each of the at least two wavenumber reference signals, and for each of the plurality of interferograms, recalculate the interferogram at the wavenumber corresponding to each of the at least two wavenumber reference signals by dividing the interferogram at said wavenumber by the transmission ratio.

According to still another example, a method for optical coherence tomography (OCT) imaging comprises the steps of obtaining a plurality of interferograms; providing at least two wavenumber reference signals at different wavenumbers, wherein the wavenumber reference signals comprise attenuated or enhanced portions of each of the plurality of interferograms; aligning each of the plurality of interferograms according to one of the at least two wavenumber reference signals; and for each of the plurality of interferograms, identifying an interferogram as missampled if another of the at least two reference signals does not align with a corresponding reference signal in a statistically significant number of the plurality of interferograms.

According to other examples of the above method, the method further comprises the step of correcting, replacing, or discarding the identified interferograms; the statistically significant number of the plurality of interferograms is a majority of the plurality of interferograms; the at least two wavenumber reference signals are generated by at least one optical notch filter; the at least one optical notch filter comprises at least one fiber Bragg grating (FBG); the at least one optical notch filter has a bandwidth between one and two times a wavenumber resolution of the OCT imaging system; the at least one optical notch filter is located before a balanced detector in the OCT imaging system; the method further comprises the steps of obtaining a spectrum profile by summing the absolute value of the interferogram, calculating a transmission ratio at the wavenumber corresponding to each of the at least two wavenumber reference signals, and for each of the plurality of interferograms, recalculating the interferogram at the wavenumber corresponding to each of the at least two wavenumber reference signals by dividing the interferogram at said wavenumber by the transmission ratio; and/or one of the at least one optical notch filters has a center wavenumber in one half of wavenumbers associated with a light source of the OCT imaging system and another of the at least one optical notch filters has a center wavenumber in the other half of wavenumbers associated with the light source of the OCT imaging system.

These and other embodiments are described in more detail below.

DETAILED DESCRIPTION OF THE INVENTION

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

Despite the use of a k-clock and an FBG in SS-OCT as described above, missampling still commonly occurs, which causes data point loss, where the loss of a single data point can result in a significantly higher noise level.

Figure 1:
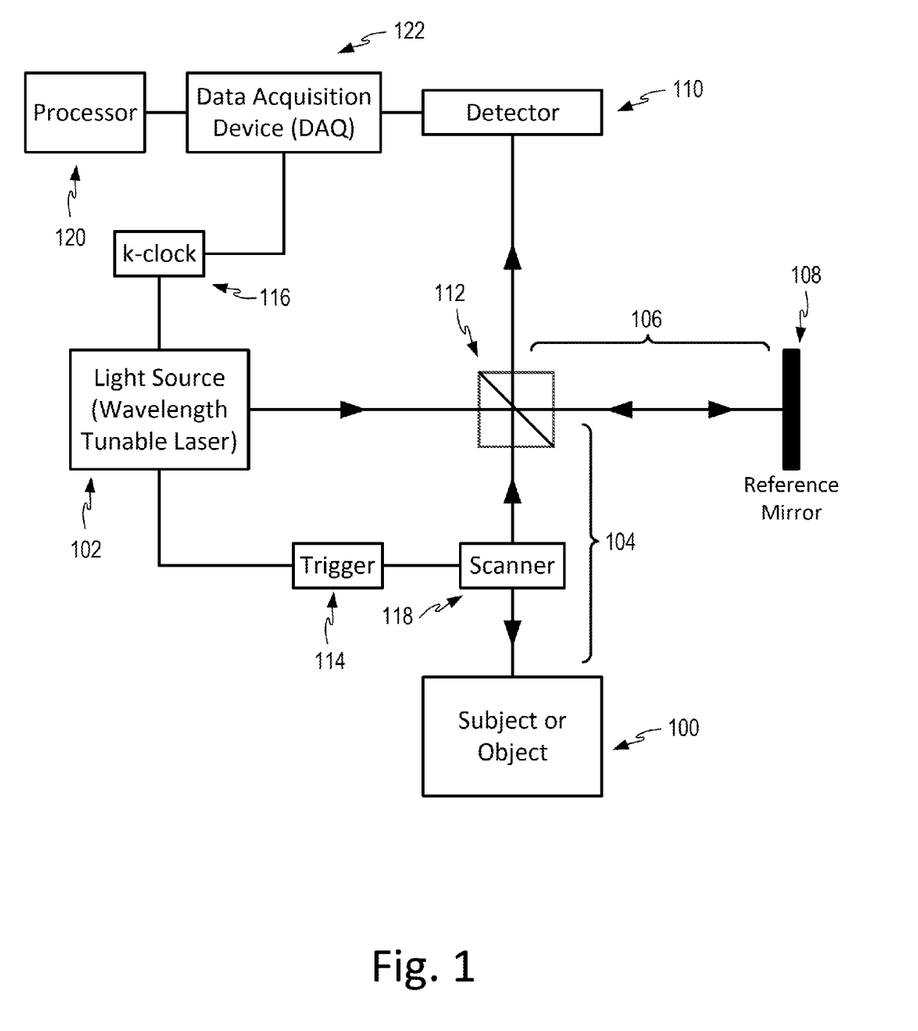
FIG. 1 illustrates a schematic diagram of a swept source OCT imaging system utilizing a k-clock to ensure the linearity of the sampling points for the interferogram in k-space.

Turning attention to the figures, FIG. 1 illustrates a non-limiting example of an OCT imaging system in which one or more aspects described herein can be implemented. FIG. 1 is a simplified depiction of an OCT imaging system intended to provide a general structural overview and does not necessarily represent a complete implementation of an imaging system. For example, optical elements such as polarization controllers, additional beam splitters, other light paths, etc., are omitted for clarity.

In general, OCT operates according to many of the same basic principles as ultrasonography but utilizes light as a medium whereas ultrasonography utilizes sound. That is, OCT images a subject or object 100 by irradiating the subject or object 100 with light and measuring a time delay and intensity of reflected light. However, light is much faster than sound. So, unlike the time delay in an ultrasound echo, the time delay of the reflected light is not directly measured. Instead, OCT utilizes low-coherence interferometry to detect time differences corresponding to distances between structures of the subject. Particularly, a low-coherence broadband light source is split into a sample portion and a reference portion. The reference portion travels a path, through a reference arm 106 of the OCT system, toward a reference (i.e., a reference mirror 108) at a known distance from a light source 102 where it is reflected back through the reference arm 106. At the same time, the sample portion is directed through a sample arm 104 of the OCT system towards the subject or object 100 (e.g., an eye and, specifically, the retina) where it is reflected back through the sample arm 104. The reflected reference portion and sample portion are recombined and then directed to an optical detector 110. When a distance traveled by the sample portion and a corresponding reflection off the subject or object 100 is within a coherence length of a distance travelled by the reference portion and its corresponding reflection, an interference pattern is generated. The interference pattern indicates an intensity of light at a certain depth of the subject, which in turn, facilitates generating image data pertaining to the subject.

In one aspect, the OCT imaging system in FIG. 1 is configured to generate cross-sectional images. Such images are generated, generally, by impinging light from a light source 102 onto the subject or object 100 and observing reflected light. The light source can be a low-coherence broadband in the case of spectral-domain OCT or a tunable laser in the case of swept source OCT (SS-OCT). Light emitted from the light source 102 is split by an optical adaptor 112, such as a beam splitter, into two portions: a sample portion that travels toward the subject or object 100 in a sample arm 104, and a reference portion that travels along a path toward a reference reflector 108 in a reference arm 106. In some embodiments, the reference portion can include a fiber optic cable leading to a collimator (not shown), which transmits the light from the light source 102 to an optical element (not shown), such as a lens, for focusing onto the reference mirror 108. Similarly, the sample portion can follow a fiber optic cable to a collimator (not shown), which transmits light to a scanner 118. The scanner is configured to direct or scan the light over various points of a surface of the sample subject or object 100. In particular, the scanner enables a 2D B-scan of the sample 100.

According to the principles of OCT, when a distance traveled by the sample portion and a corresponding reflection off the subject or object 100 is within a coherence length of a distance travelled by the reference portion and its corresponding reflection, an interference pattern is generated. The interference pattern is detected by a detector 110, sampled and digitized by data acquisition device (DAQ) 122 and output as image data, which can be an interferogram. The interference pattern encodes intensity information for portions of the subject or object 100 which are scanned, which in turn, facilitates generating displayable images of the subject or object 100. The image data can be provided to an image processor 120 for processing.

A "processor" as used herein refers to any, or part of any, electrical circuit comprised of any number of electrical components, including, for example, resistors, transistors, capacitors, inductors, and the like. The circuit may be of any form, including, for example, an integrated circuit, a set of integrated circuits, a microcontroller, a microprocessor, a collection of discrete electronic components on a printed circuit board (PCB) or the like. The processor may also stand alone or be part of a computer used for operations other than processing image data. It should be noted that the above description is non-limiting, and the examples are but only a few of many possible processors envisioned.

To derive intensity information at varying depths of the subject, several different techniques can be utilized. In FD-OCT techniques, various wavelengths can be encoded, spatially or temporally for example, where different detected frequencies of interference signal correspond to different depths within the subject. A Fourier analysis on a received signal that represents reflected intensities at different frequencies generates the intensities reflected at different depths at a point of the subject.

According to one example of an FD-OCT technique, SS-OCT, a wavelength tunable light source 102 is utilized to scan over different wavelengths. The intensities at each scanned wavelength can be collected and transformed by a Fourier analysis to generate an intensity profile that details intensities at various depths. In SS-OCT, a sweep trigger 114 triggers the movement of the scanner 118 in the direction of the desired scan to detect a new A-line for each tuning period 200 of the light source 102. That is, for each A-line, the entire bandwidth of the tunable laser 102 is transmitted and detected. After every A-line has been detected for the desired scan, a B-scan image can be formed from the A-lines.

Figure 2:
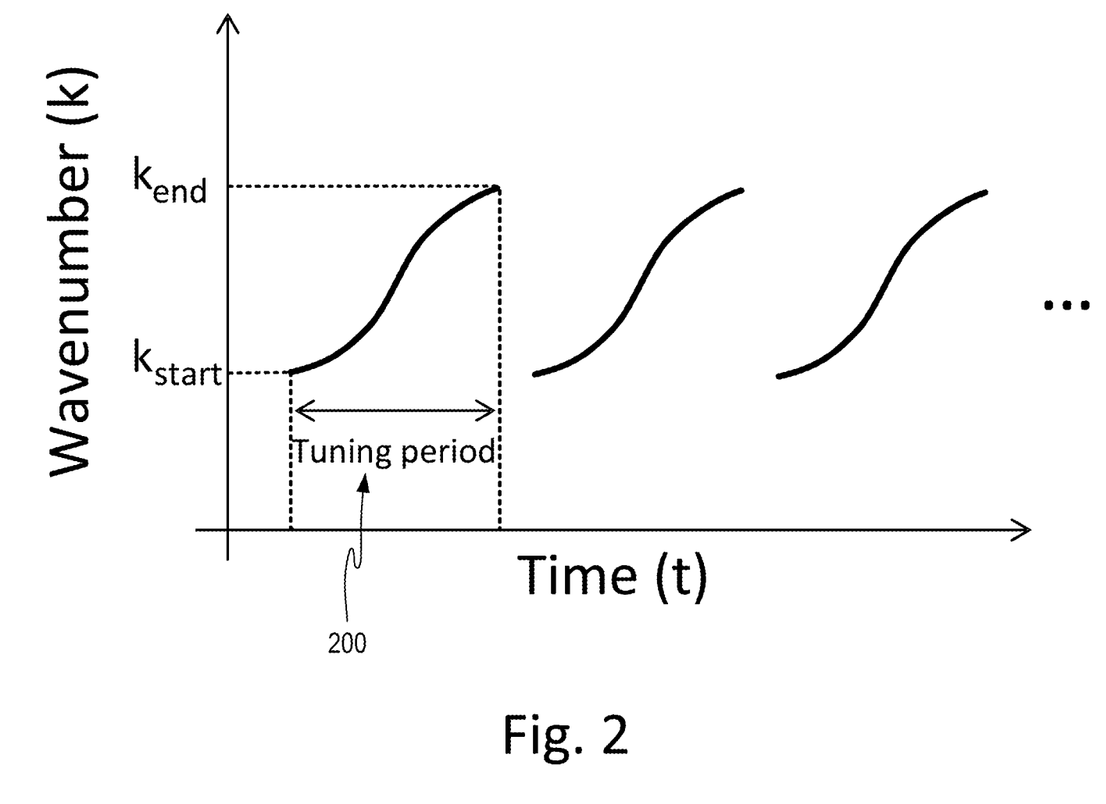
FIG. 2 illustrates the non-linear sweeping of wavenumbers in a wavelength tunable light source of a swept source OCT imaging system.
Figure 3A:
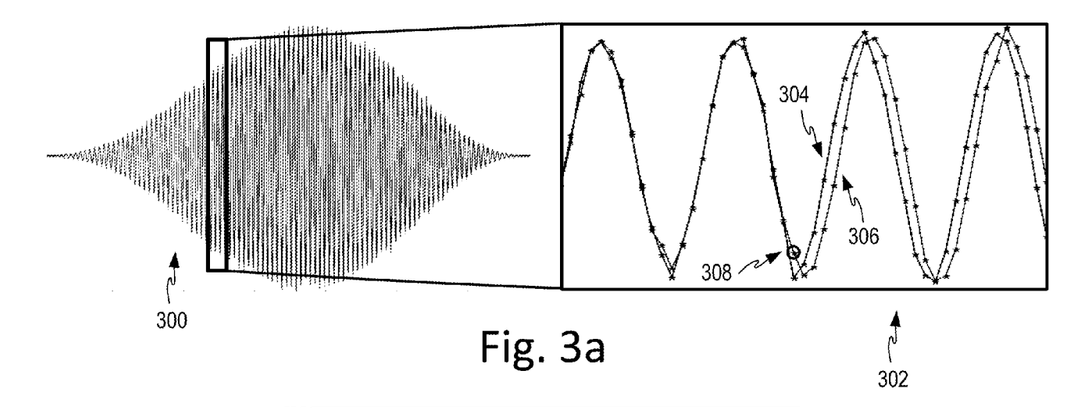
FIG. 3*a* illustrates missampling associated with interferograms caused by wavenumber uncertainty.
Figure 3B:
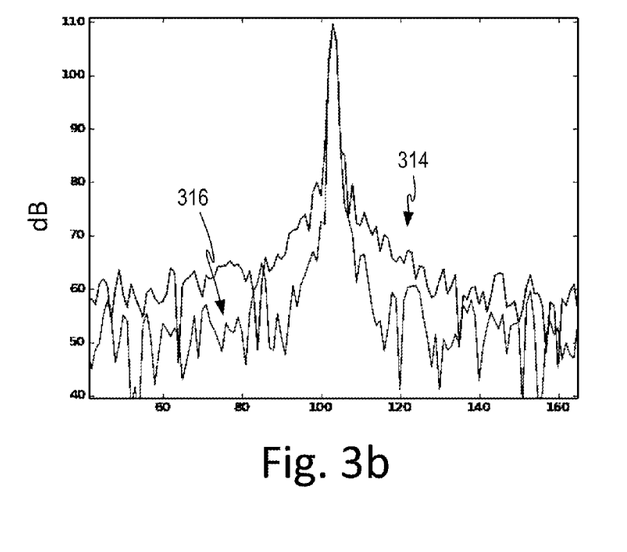
FIG. 3*b* illustrates the resulting noise in an interferogram associated with the missampling.

As can be seen in FIG. 2, the tuning period 200, in k-space (where k=wavenumber=1/wavelength), of the tunable light source 102 is often non-linear with respect to time. As also shown, there is often a dead time between tuning periods 200. Therefore, an external k-clock 116 is commonly used to ensure the linearity of the sampling points in k-space for each tuning period. A sweep trigger 114 can be provided by the light source 102 to move the scanner 118 at the beginning of each tuning period 200, so that each A-line comprises the entire tuning period 200 of the light source 102. However, the k-clock 116 and sweep trigger 114 may be asynchronous, causing an uncertainty as to the starting wavelength of the tuning period for a particular A-line. Such uncertainty affects phase sensitive measurements by introducing depth dependent phase jittering or deviation among the A-lines. This can also result in missampling that causes data point loss. Such missampling, as illustrated in FIG. 3, may be the result of mechanical or optical jittering during laser sweeping, or because the external linear k-clock varies its frequency rapidly to accommodate the nonlinearity of the wavelength tuning period. For high speed SS-OCT, the sampling clock goes up to a fairly high frequency (e.g., >100 MHz) and, more importantly, its frequency varies extremely rapidly—about $4 \times 10^{13}$ Hz/s.

Referring now to FIG. 3a, two detected interferograms 304, 306 are shown overlayed on each other 300. An exploded view 302 of the overlayed interferograms 300 is shown where a missampling has occurred. As can be seen in the exploded view 302, a missampled interferogram 304 is missing a data point 308 that exists in a correctly sampled interferogram 306. In other words, missampled interferogram 304 comprises at least one fewer data point than correctly sampled interferogram 306. As a result, there is a phase shift of one data point between missampled interferogram 304 and correctly sampled interferogram 306. FIG. 3b illustrates point spread functions 314 and 316 for the missampled interferogram 304 and correctly sampled interferogram 306, respectively. As can be seen, the baseline noise for the missampled interferogram 304 is roughly 10 dB higher than that of the correctly sampled interferogram 306.

In one aspect, various techniques may be used correct the starting wavenumber uncertainty discussed above. One such technique requires generating a wavenumber reference signal so that detected interferograms can be aligned according to a known wavenumber or wavelength. That is, rather than generating a B-scan by aligning interferograms according to sample numbers as they were detected, the interferograms may be shifted and aligned according to whatever sample number corresponds to the known wavelength or wavenumber of the wavenumber reference signal.

In another aspect, a second wavenumber reference signal can be used to detect missampling, according to methods discussed below. In short, these methods align interferograms according to one wavenumber reference signal and look for misalignment at other wavenumber reference signals, where misalignment indicates a missampled interferogram.

A "reference signal" as used herein means a detected interference signal that is attenuated or enhanced beyond the normally detected signal levels of an interferogram. One way of generating wavenumber reference signals is by using an optical element such as an optical notch filter. One such filter is a Fiber Bragg grating (FBG), a type of distributed Bragg reflector constructed in a short segment of optical fiber that reflects particular wavelengths of light and transmits all others. This effect is achieved by creating a periodic variation in the refractive index of the fiber core, which generates a wavelength specific dielectric mirror. FBGs, therefore, can be used as an inline optical filter to block certain wavelengths, or in other words, act as a wavenumber-specific reflector for generating a wavenumber reference signal. It should be noted that optical notch filters and FBGs are used throughout this description for illustrative purposes for generating wavenumber reference signals. However, FBGs and optical notch filters are but a single technique, and should not be seen as a limiting embodiment. In other embodiments, a bandpass filter may be used, wherein the upper and lower frequencies of the bandpass filter each represent wavenumber reference signals at the corresponding wavenumbers.

In selecting an exemplary filter to use in the present invention, it is important to look for filters that can generate stable and high resolution reference signals. Specifically, for ophthalmic OCT applications, the spectral resolution often goes below 0.1 nm to provide sufficient imaging range. Therefore, it is desirable for the filter used to generate reference signals to have substantial transmission ratio change within 0.1 nm, so that the reference signal has resolution that is better than 0.1 nm. For other OCT applications, a lower or higher resolution may be applicable.

Figure 4:
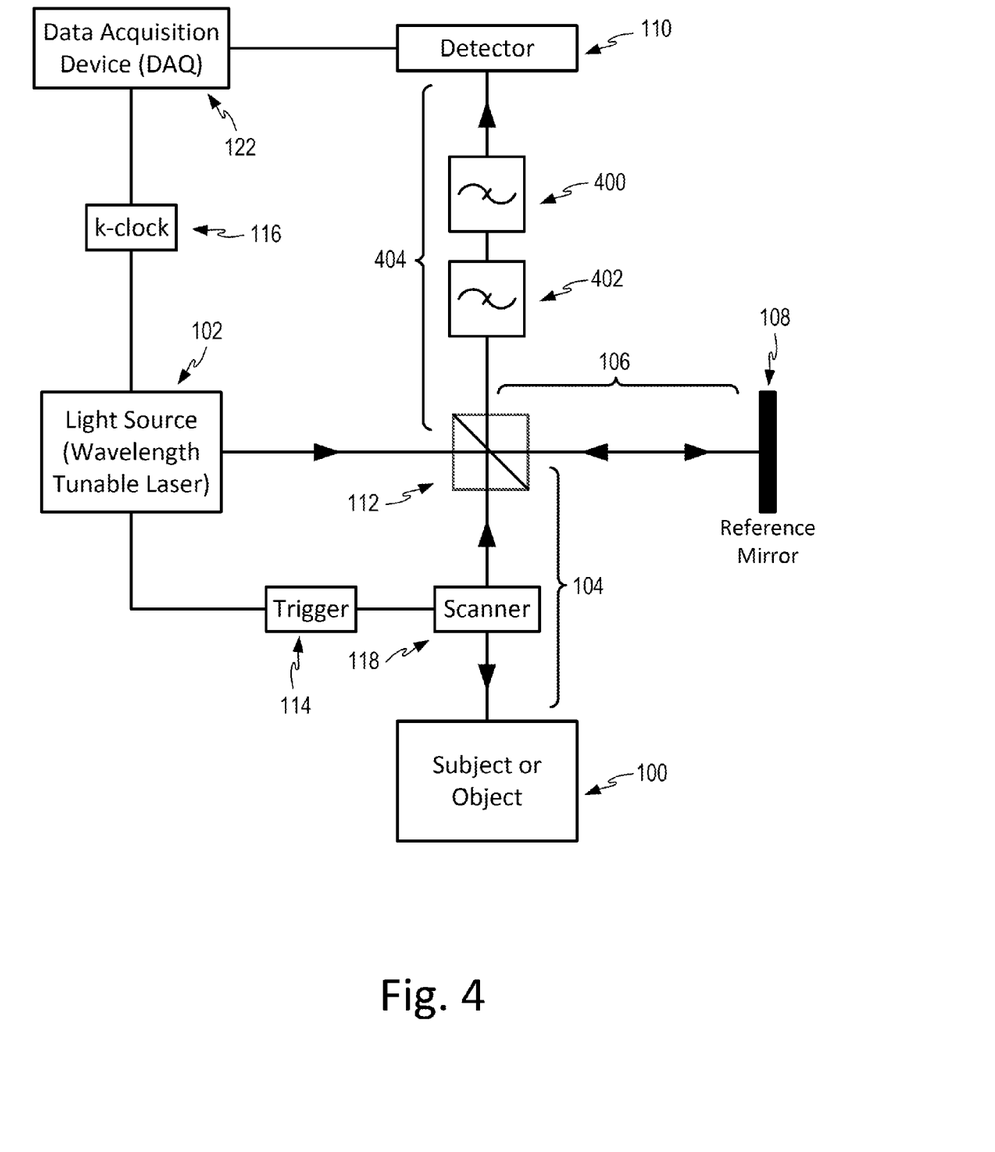
FIG. 4 illustrates a schematic diagram of a swept source OCT imaging system utilizing a filters to generate wavenumber reference signals.

FIG. 4 illustrates one embodiment of an SS-OCT imaging system of the present invention utilizing two filters to generate wavenumber reference signals. The OCT system of FIG. 4 comprises many of the same elements discussed in relation to FIG. 1, such as the light source 102, reference mirror 108, subject or object 100, optical adapter or beam splitter 112, k-clock 116, data acquisition device (DAQ) 122 sweep trigger 114, and scanner 118. However, FIG. 4 adds two optical notch filters 400, 402, corresponding to two wavenumbers, to the detection arm 404 of the OCT system. In such an embodiment, light recombined in the detection arm passes through each filter in series. Although the optical notch filters 400, 402 are shown as distinct elements, they may exist in a single filter device as a double notch filter. In other embodiments, a single bandpass filter may be used, as well as other devices or filters known to those skilled in the art to generate a wavenumber reference signal by attenuating or enhancing the signal detected at known wavelengths.

Additionally, although the example embodiment of FIG. 4 shows both optical notch filters 400, 402 being located in the detection arm 404, it should be appreciated that the optical notch filters 400, 402 can be placed anywhere in the optical paths of the OCT system. For example in other embodiments, the detection arm 404 may be split into two parallel light paths. In such an embodiment, the optical notch filters 402, 404 may be placed in parallel rather than in series. In still other embodiments, the optical notch filters 402, 404 may be placed in the sample arm 104, reference arm 106, or between the light source 102 and optical adapter 112, in a similar fashion to those embodiments discussed with respect to the detection arm 404. The optical notch filters 402, 404 may be placed in the same arm or in different arms of the OCT system. When a balanced detector is used in the OCT system, inserting optical notch filters before the balanced detector is the most effective way to generate the wavenumber reference signal because inserting the optical notch filters elsewhere results in suppression of the wavenumber reference signal by the balanced detector as common mode noise. However, it is noted that it is still possible to generate a wavenumber reference signal by inserting the optical notch filters elsewhere because usually the splitter ratio of the coupler before the balanced detector is not perfectly 50/50 at the referenced wavenumber. Given various design limitations that may be required by in developing an OCT system, locations other than before a balanced detector may be the most desirable. In still further embodiments, more than two optical notch filters may be used for generating more than two wavenumber reference signals.

Figure 5:
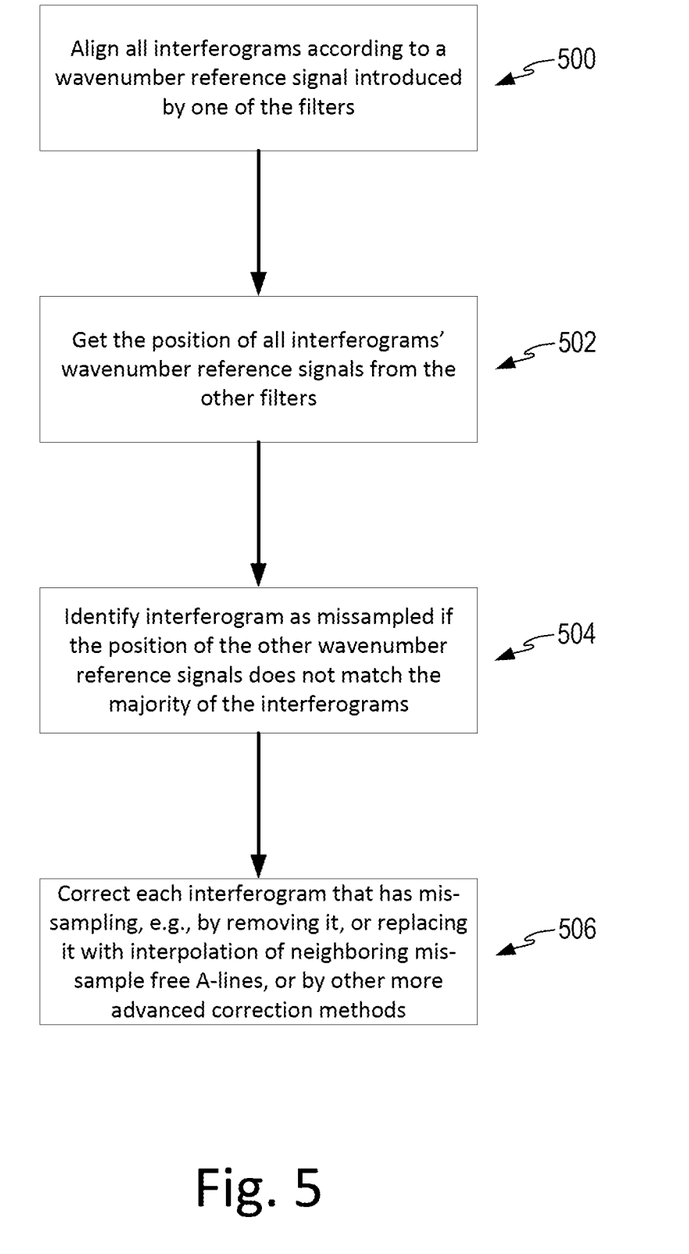
FIG. 5 is a flow chart illustrating a method for detecting missampled interferograms.
Figure 6:
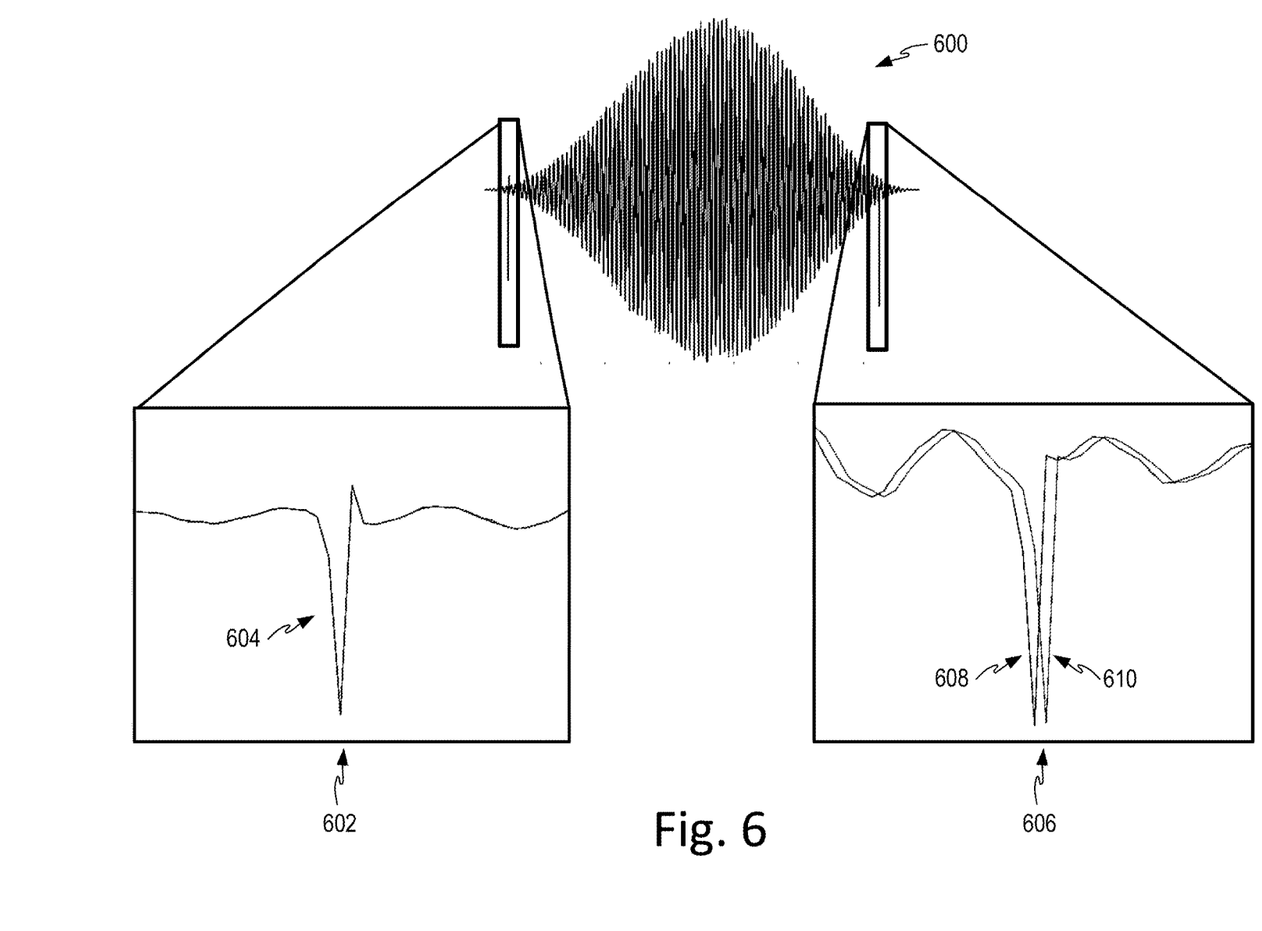
FIG. 6 graphically illustrates alignment of interferograms according to two wavenumber reference signals.

FIG. 5 illustrates one possible method for detecting missampled interferograms using reference signals. A graphical depiction of some of the steps of FIG. 5 is shown in FIG. 6. In a first step 500, interferograms 600 representing each A-line of a scan are aligned according to one of the wavenumber reference signals 604, as shown in exploded view 602, so as to remove any starting wavenumber uncertainty. In a second step 502, the interferograms 600 are analyzed with respect to at least one other wavenumber reference signal, as shown in exploded view 606. Although FIG. 6 illustrates first aligning the left most wavenumber reference signal, then the right most wavenumber reference signal, it should be noted that any wavenumber reference signal may be used for removing uncertainty and any other wavenumber reference signal may be used to detect missampling. In the case of missampling, the other wavenumber reference signal for the missampled interferograms 608 will not align with the wavenumber reference signal of properly sampled interferograms 610. Thus, it may be determined that a missampling occurred with respect to a wavenumber between the two wavenumber reference signals 604 and 608, 610. According to a third step 504, misaligned interferograms are identified as missampled. Accordingly, it is ideal to generate wavenumber reference signals at the very beginning and end of the tuning spectrum so as to identify as many missampled points as possible. However, the farther apart in the tuning period each wavenumber reference signal is, the harder it is to determine where in the light source spectrum the missampling occurred. Of course, it is also possible to use more than two wavenumber reference signals, however, as the quantity of wavenumber reference signals increases, the number of wavelengths in the tuning spectrum that are affected (either attenuated or enhanced) increases as well. As more wavelengths are affected, the quality of the scan decreases. Therefore, it is another aspect, discussed below, to use a filter with an optimized bandwidth and to compensate the data points affected in generating the reference signals.

Other methods for identifying missampled interferograms are also envisioned. For example, given a known sampling rate and wavelength tuning period, it is possible to determine the number of data points that should be collected between any two wavenumber reference signals. This is accomplished by multiplying the period between the two wavenumbers used as reference signals of the wavelength tuning period by the sampling rate. Then, after an interferogram has been acquired, the sample number for each wavelength reference number would be determined. If the absolute value of the difference between the sample numbers for each wavenumber reference signal does not match the determined number of data points that should be collected, then that interferogram was missampled at some point between the two wavenumber reference signals.

Once an interferogram has been identified as missampled in the third step 504, it may be desirable to discard the interferogram or try to correct the interferogram. If the interferogram is discarded, a B-scan may still be generated, however. In one embodiment, the B-scan can simply be compiled without the missampled interferogram. In other embodiments, the missampled interferogram can be replaced by an identical copy of the interferograms directly before and after it, or by interpolation techniques or averaging of the interferograms before and after it. Rather than replacing the entire interferogram, it may also be possible to actually correct the lone missampled portion of the missampled interferogram. Again, a number of interpolation or interpolation-like techniques are envisioned. In these cases, it is likely first necessary to determine where the missampling occurred. It may be possible to find the missampled point by sophisticated numerical methods known to those of ordinary skill in the art. For instance, piece wise correlation can be performed with the neighboring good data to locate the missampling. If the interferogram has been oversampled, the extra data point(s) can simply be removed. However, if the interferogram has been undersampled, then an interpolation technique could be used to recreate the missing data point(s). One example of an interpolation technique is to average the data points directly before and after where the missed data point should belong, then insert a data point with the averaged value at the missampled location. Another technique relies on averaging the interferograms directly before and after the missampled interferogram at the data point corresponding to the missampled data point. Another technique might involve merely duplicating the data point from a neighboring interferogram. It should be noted that any interpolation technique or any technique for replacing a missing data point known to those skilled in the art could be used.

In another aspect, the optical notch filters are optimized to minimize the number of data points affected by each optical notch filter. The wavenumber reference signals contain a set of data points that are affected due to the blocking of light by the optical notch filters. Some of the affected data points may be simply distorted, while others may be saturated. These affected data points, especially those saturated ones, inevitably compromise the signal integrity and thus cause undesirable artifacts in the OCT image. In optimizing the bandwidth of an optical notch filter, at least two factors should be taken in to account. First, when the bandwidth of the wavenumber reference signal is much smaller than the resolution of an OCT system, it may not be "visible" to the OCT system and, thus, the wavenumber reference signal is of no use. Therefore, the resolution of the OCT system establishes a lower boundary for the bandwidth of the wavenumber reference signal. Second, as previously mentioned, a larger bandwidth of the wavenumber reference signal will result in more data points being affected. Therefore, the upper boundary for the bandwidth of the wavenumber reference signal should be as small as possible to minimize the number of affected data points. In one embodiment, the optimal bandwidth for the optical notch filters is between $\delta k$ and $2\delta k$, where $\delta k$ is the wavenumber resolution of the SS-OCT system. Such optimal bandwidth provides the wavenumber reference signal with at least one data point.

Figure 7:
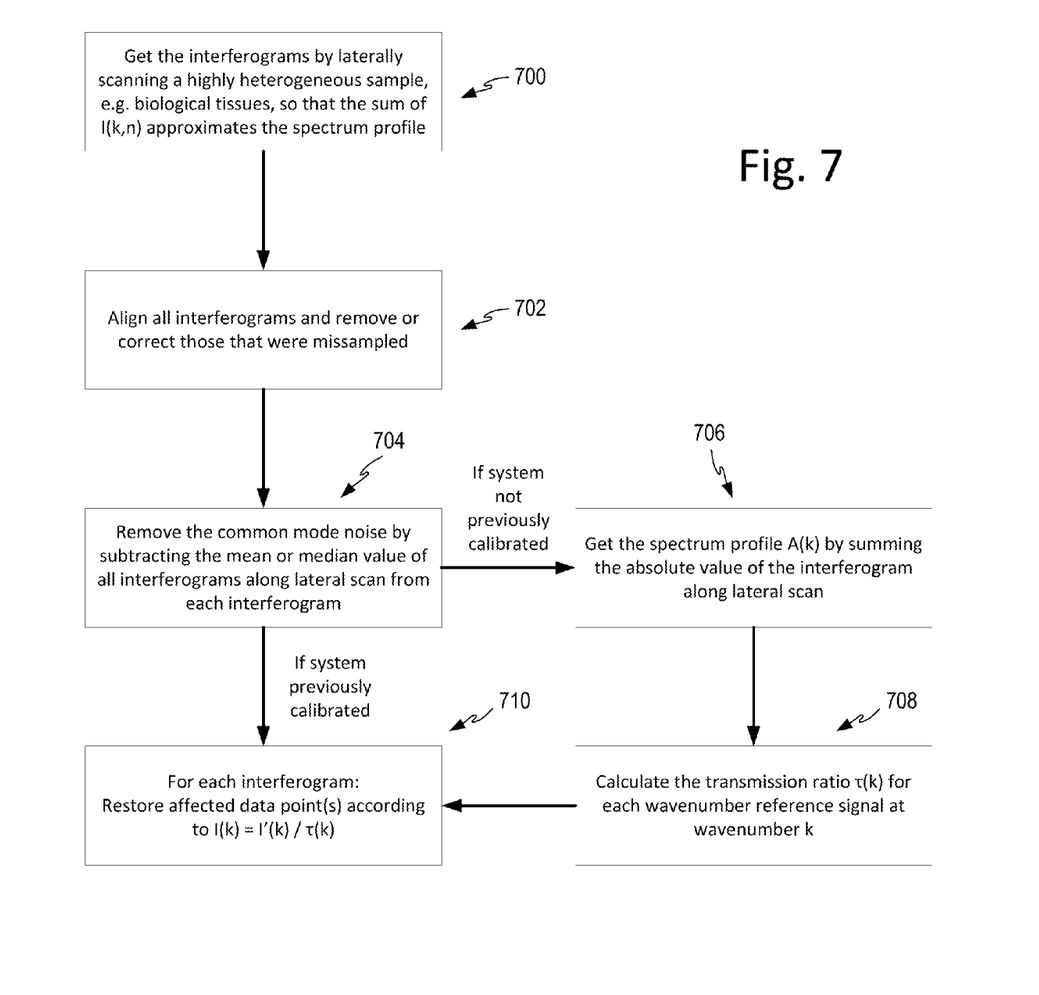
FIG. 7 is a flow chart of one method for compensating data points affected by the optical notch filter.
Figure 8:
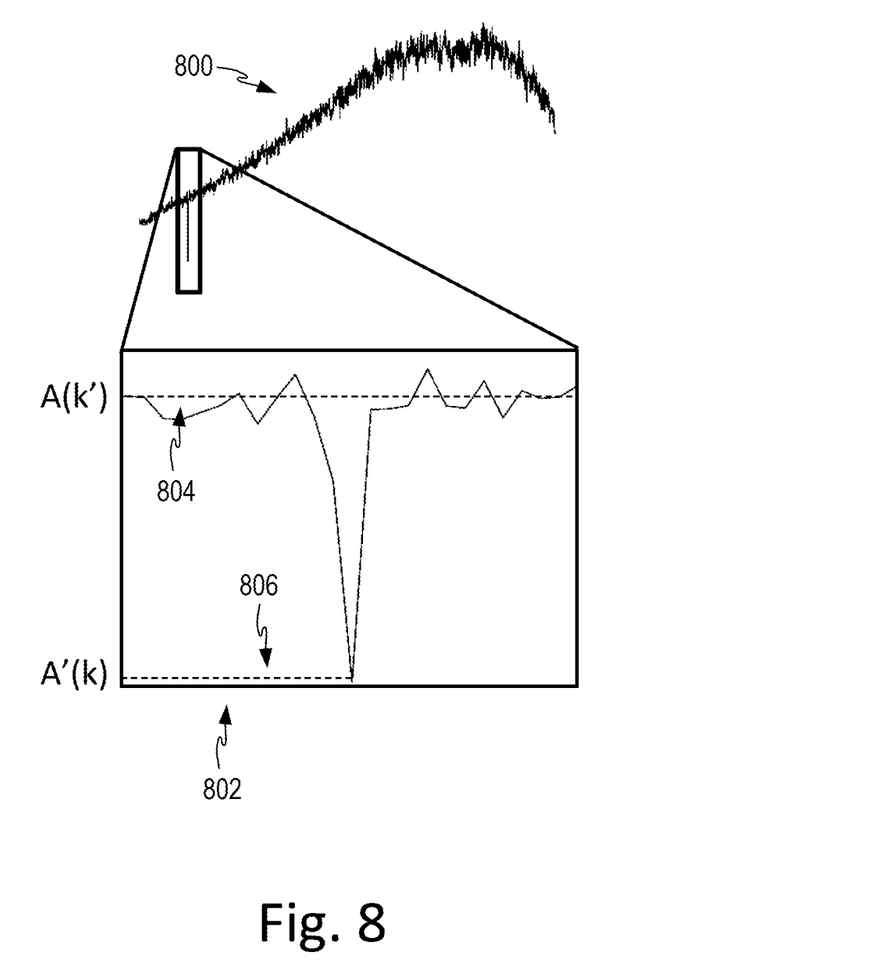
FIG. 8 illustrates the visual meaning of the variables used in the method for compensating data points as shown in FIG. 7.

In another aspect, as illustrated in FIGS. 7 and 8, data points affected by the optical notch filters are compensated for, and restored, to decrease the effect each optical notch filter has on the quality of the image. Although saturated data points carry no interference signal, non-saturated data points contain an interference signal that can be restored. One method for restoring these non-saturated data points is described herein. It is noted that this compensation method benefits from the optimization of the optical notch filter bandwidth, as previously discussed, to minimize the number of data points affected in that the approximation is more accurate.

According to the method illustrated in the flow chart of FIG. 7, interferograms are first obtained 700 by laterally scanning a highly heterogeneous sample, e.g. biological tissues, so that the sum of I(k, n) approximates the spectrum profile. In the second step 702, each interferogram is aligned and those with missampling are removed or corrected. This step may be performed by the method described above with respect to FIGS. 5 and 6 or similar techniques known to those skilled in the art. Although not necessary, according to one embodiment, common mode noise is removed 704 from the remaining interferograms by subtracting the mean or median value of all interferograms along the lateral scan from each interferogram.

The next steps 706 and 708 represent a one-time calibration of the OCT system comprising wavenumber reference signals at wavenumbers $k=\{k_1, k_2, k_3, \ldots, k_n\}$. As used in this method, the value of each sampling point, that is, the data point value in acquired interferogram data is defined as:

$$I(k)=A(k)\cos(kz+\phi)$$

where (k) is the spectrum profile of the light. According to step 706, the spectrum profile is determined by summing the absolute value of the interferogram along the lateral scan, where n is the index of interferograms along the lateral scan, according to the equation $A(k) \propto \Sigma_n |I(k, n)|$.

Due to the insertion of an optical notch filter for the bandwidth within the wavenumber reference signal, light is partially blocked and the data point value becomes:

$$I'(k)=\tau(k) \cdot A(k)\cos(kz+\phi)$$

where $\tau(k)$ is the transmission ratio at wavenumber k. Thus, step 708 is the calculation of $\tau(k)$ for the OCT system. If OCT data is acquired with many interferograms along a lateral scan, $\tau(k)$ can be approximated by:

$$\tau(k) = \frac{\Sigma_n |I'(k, n)|}{\Sigma_n |I(k, n)|} \approx \frac{\Sigma_n |I'(k, n)|}{\Sigma_n |I(k', n)|}$$

An approximated spectrum profile can be generated by finding the sum of the absolute value of all interferograms along the lateral scan. Due to its narrow bandwidth, the spectrum profile around the wavenumber reference signal can be considered as a flat line. Therefore, $\Sigma_n |I(k, n)|$ can be approximated by neighboring unaffected data points $\Sigma_n |I(k', n)|$, where k' represents the unaffected wavenumbers neighboring k.

As discussed above, the spectrum profile A(k) is generated by finding the sum of the absolute value of each interferogram along the lateral scan. $\tau(k)$ can then be found according to the equation:

$$\tau(k)=A'(k)/A(k')$$

where A(k') 802 is the averaged value of neighboring unaffected data points near k, and A' (k) 804 is the value of the affected data point at k. The graphical meanings of A(k') 802 and A' (k) are illustrated in FIG. 8, which shows a graph of A(k) 800 comprising a wavenumber reference signal shown in exploded view 802.

Once the system has been calibrated once, affected data points can be restored according to step 710 as:

$$I(k)=I'(k)/\tau(k)$$

It should be noted that the order of the steps in the above method may be varied depending on the embodiment. For example, the system may first be calibrated according to steps 706 and 708 before obtaining interferograms for the current scan, presuming the system previously generated a set of interferograms to be used in calibration. Additionally, affected data points may be restored prior to identifying missampled interferograms. In still other embodiments, the removal of common mode noise according to step 704 and the restoration of affected data points according to step 710 may both be performed on a single interferogram before proceeding to the next interferogram in the scan, or could individually be performed on every interferogram before proceeding to the next step. Similarly, other variations to the steps or order of the steps in the method known to those skilled in the art are within the scope of the presented method.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A method for imaging with frequency domain optical coherence tomography (OCT) imaging system having a reference arm, a sample arm, and a detection arm, comprising the steps of:
    using an optical detector of the detection arm to obtain a plurality of interferograms formed by an interference of light from the sample arm and the reference arm, each of the plurality of interferograms comprising at least two optically generated reference signals corresponding to different wavelengths;
    digitizing each of the plurality of interferograms such that each digitized interferogram comprises a first digital sample of a first of the at least two reference signals and a second digital sample of a second of the at least two reference signals, the first digital sample being at a first sample number and the second digital sample being at a second sample number;
    for each digitized interferogram, determining an absolute value of a difference between the first sample number and the second sample number;
    identifying a digitized interferogram as having a digitization error if the determined absolute value of the difference for that digitized interferogram does not match the determined absolute value of the difference for a statistically significant number of digitized interferograms; and
    correcting, replacing, or discarding any identified digitized interferograms.

2. The method of claim 1, wherein the at least two optically generated reference signals are generated by at least one optical element comprising at least one optical notch filter.

3. The method of claim 2, wherein a first of the at least one optical notch filters has a center wavenumber in a first half of wavenumbers associated with a light source of the OCT imaging system, and a second of the at least one optical notch filters has a center wavenumber in a second half of wavenumbers associated with the light source of the OCT imaging system.

4. The method of claim 1, wherein the statistically significant number of digitized interferograms is a majority of digitized interferograms.

5. The method of claim 2, wherein the at least one optical notch filter comprises at least one fiber Bragg grating (FBG).

6. The method of claim 1, wherein the at least two optically generated reference signals are generated by at least one optical element having a bandwidth of between one and two times a wavenumber resolution of the OCT imaging system.

7. The method of claim 1, wherein the at least two optically generated reference signals are generated by at least one optical element located before the optical detector in the OCT imaging system.

8. The method of claim 1, further comprising the steps of:
obtaining a spectrum profile of one of the digitized interferograms by summing absolute values of signals comprising the one of the digitized interferograms;
calculating a transmission ratio at the first digital sample and the second digital sample of the one of the digitized interferograms; and
for each digitized interferogram, dividing the first digital sample and the second digital sample by the transmission ratio.

9. A frequency domain optical coherence tomography (OCT) imaging system comprising:
a light source;
a reference arm;
a sample arm;
a detection arm;
at least one optical element;
an optical detector of the detection arm configured to obtain a plurality of interferograms formed by an interference of light from the sample arm and the reference arm, each of the plurality of interferograms comprising at least two optically generated reference signals corresponding to different wavelengths, the at least two optically generated reference signals being generated by the at least one optical element;
a data acquisition device configured to digitize each of the plurality of interferograms such that each digitized interferogram comprises a first digital sample of a first of the at least two reference signals and a second digital sample of a second of the at least two reference signals, the first digital sample being at a first sample number and the second digital sample being at a second sample number; and
a processor configured to:
for each digitized interferogram, determine an absolute value of a difference between the first sample number and the second sample number;
identify a digitized interferogram as having a digitization error if the determined absolute value of the difference for that digitized interferogram does not match the determined absolute value of the difference for a statistically significant number of digitized interferograms; and
correct, replace, or discard any identified digitized interferograms.

10. The OCT imaging system of claim 9, wherein the at least one optical element comprises at least one optical notch filter.

11. The OCT imaging system of claim 10, wherein the at least one optical notch filter comprises at least one fiber Bragg grating (FBG).

12. The OCT imaging system of claim 10, wherein the at least one optical notch filter has a bandwidth between one and two times a wavenumber resolution of the OCT imaging system.

13. The OCT imaging system of claim 10, wherein a first of the at least one optical notch filters has a center wavenumber in a first half of wavenumbers associated with the light source of the OCT imaging system, and a second of the at least one optical notch filters has a center wavenumber in a second half of wavenumbers associated with the light source of the OCT imaging system.

14. The OCT imaging system of claim 9, wherein the at least one optical element is located in the detection arm.

15. The OCT imaging system of claim 9, wherein the statistically significant number of digitized interferograms is a majority of the digitized interferograms.

16. The OCT imaging system of claim 9, wherein, the processor is further configured to:
obtain a spectrum profile of one of the digitized interferograms by summing absolute values of signals comprising the one of the digitized interferograms;
calculate a transmission ratio at the first digital sample and the second digital sample of the one of the digitized interferograms; and
for each digitized interferogram, divide the first digital sample and the second digital sample by the transmission ratio.

* * * * *

UNITED STATES PATENT AND TRADEMARK OFFICE
CERTIFICATE OF CORRECTION

PATENT NO. : 10,317,189 B2
APPLICATION NO. : 14/161796
DATED : June 11, 2019
INVENTOR(S) : Zhijia Yuan et al.

Page 1 of 1

It is certified that error appears in the above-identified patent and that said Letters Patent is hereby corrected as shown below:

In the Specification

Column 11, Line 11, "(k)" should read -- A(k) --.

Signed and Sealed this
Eighteenth Day of February, 2020

Andrei Iancu
*Director of the United States Patent and Trademark Office*